(12) United States Patent
Matsubayashi

(10) Patent No.: US 8,204,104 B2
(45) Date of Patent: Jun. 19, 2012

(54) FRAME RATE CONVERSION SYSTEM, METHOD OF CONVERTING FRAME RATE, TRANSMITTER, AND RECEIVER

(75) Inventor: Kei Matsubayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1474 days.

(21) Appl. No.: 11/714,108

(22) Filed: Mar. 6, 2007

(65) Prior Publication Data

US 2007/0211801 A1    Sep. 13, 2007

(30) Foreign Application Priority Data

Mar. 9, 2006    (JP) .................................. 2006-064614

(51) Int. Cl.
*H04B 1/66* (2006.01)
*H04N 11/02* (2006.01)

(52) U.S. Cl. ............... 375/240; 375/240.01; 375/240.16

(58) Field of Classification Search .................. 375/240, 375/240.01, 240.1, 240.12, 240.16
See application file for complete search history.

(56) References Cited

U.S. PATENT DOCUMENTS

| | | | | |
|---|---|---|---|---|
| 5,198,900 A | * | 3/1993 | Tsukagoshi | 375/240.16 |
| 5,727,091 A | * | 3/1998 | Kinouchi et al. | 382/246 |
| 6,157,396 A | | 12/2000 | Margulis et al. | |

FOREIGN PATENT DOCUMENTS

| | | |
|---|---|---|
| EP | 1838106 | 9/2007 |
| JP | 6-121280 | 4/1994 |
| JP | 07-177514 | 7/1995 |
| JP | 10-064547 | 3/1998 |
| JP | 2003-333540 | 11/2003 |
| JP | 2005-051547 | 2/2005 |
| JP | 2007-274679 | 10/2007 |
| WO | WO 2004-092934 | 10/2004 |

OTHER PUBLICATIONS

European Search Report issued Jun. 9, 2011, from the European Patent Office in corresponding European Patent Application No. 07 25 0986.

* cited by examiner

*Primary Examiner* — Hosuk Song
(74) *Attorney, Agent, or Firm* — Finnegan, Henderson, Farabow, Garrett & Dunner, L.L.P.

(57) ABSTRACT

A frame rate conversion system includes a transmitter and a receiver. The transmitter includes a decoding unit decoding a compressed video signal encoded by an encoding method using a motion vector, and an encoding unit superimposing reference control information being output from the decoding unit and containing at least a motion vector on a blanking period of the video signal decoded by the decoding unit, and outputs the video signal with the reference control information superimposed thereon. The receiver includes a decoding unit separating the reference control information from the blanking period of the video signal input from the transmitter, and a frame rate converting unit generating an interpolated frame between frames of the input video signal using the reference control information separated by the decoding unit, and converting the input video signal into the signal of a higher frame rate.

11 Claims, 7 Drawing Sheets

FRAME RATE CONVERSION SYSTEM, METHOD OF CONVERTING FRAME RATE, TRANSMITTER, AND RECEIVER

CROSS REFERENCES TO RELATED APPLICATIONS

The present invention contains subject matter related to Japanese Patent Application JP 2006-064614 filed in the Japanese Patent Office on Mar. 9, 2006, the entire contents of which being incorporated herein by reference.

BACKGROUND OF THE INVENTION

1. Field of the Invention

The present invention relates to a system, method, transmitter, and receiver capable of efficiently converting a frame rate into a higher rate using a motion vector, in the case where an apparatus that decodes a video signal encoded using the motion vector is provided separately from an apparatus that converts the decoded video signal into a signal of a frame rate higher than that of the decoded video signal and that displays the decoded video signal at a higher frame rate.

2. Description of the Related Art

A decoding unit that decodes a compressed video signal encoded by an encoding method such as MPEG-2 using a motion vector to retrieve a video signal is mounted on a DVD player, digital broadcast tuner, set-top box, and the like. The compressed video signal includes a frame encoded by intra-frame coding that compresses each actual frame and a frame encoded by inter-frame coding that compresses a difference from another reference frame. When the difference is obtained using motion predictive compensation in the inter-frame coding, an image is generated using the motion vector to predict a moving destination of a video block contained in another reference frame, and the difference from the predicted image is obtained to efficiently perform encoding.

On the other hand, in order to reduce a blur in a moving image and to smoothly represent moving images, a frame rate converting unit that performs a frame rate conversion by generating an interpolated frame between frames of video has been mounted on a television receiver and the like. Although a plurality of methods are available as the method of generating the interpolated frame, a comparatively accurate interpolated frame can be generated by a method using a motion vector between the video blocks in the frames previous and subsequent to the interpolated frame to predict the interpolated frame picture that is an intermediate image of those frames.

However, a calculation cost to detect the motion vector is not small, because whether the same image exists in the respective video blocks contained in two frames is checked using various combinations of positions. Further, in the case where the video the frame rate of which was converted is displayed in real time, higher computational capability may be required, since the motion vector needs to be detected within a limited period of time until the next frame after the conversion is displayed. Japanese Unexamined Patent Application Publication No. 2003-333540 (paragraphs No. 0010 through 0011, and FIG. 1) discloses a frame rate converter that uses the motion vector obtained in the above-described decoding processing also for the frame rate conversion, thereby greatly reducing the calculation cost and efficiently performing the frame rate conversion.

The frame rate converter disclosed in Japanese Unexamined Patent Application Publication No. 2003-333540 includes a decoding unit 100 and a frame rate converting unit 101 which are provided in the same display apparatus (such as a television receiver), as shown in FIG. 1. A video signal and a motion vector are sent from the decoding unit 100 to the frame rate converting unit 101 through an internal bus or the like.

A video buffer 102 stores the video signal in the frame rate converting unit 101 and an interpolated vector generating unit 103 generates an interpolated vector using the motion vector having been used for predicting pictures previous and subsequent to the interpolated frame. Subsequently, an interpolated frame generating unit 104 reads the pictures previous and subsequent to the interpolated frame from the video buffer 102 and generates a predicted frame at a position in terms of time of the interpolated frame using the interpolated vector. Further, a selector 105 selects and outputs the picture (real frame) stored in the video buffer 102 and the generated interpolated frame according to the frame rate.

SUMMARY OF THE INVENTION

The frame rate converter described in the above patent reference is proposed on the basis that the decoding unit and the frame rate converting unit are provided in the same apparatus. However, the decoding unit and the frame rate converting unit are not necessarily mounted on the same apparatus in actual products. Because, the frame rate converting unit has a relationship with a frame rate at which the display apparatus is capable of displaying, and there is a high possibility that the frame rate converting unit is provided to the display apparatus. Further, the decoding unit depends on a video compressing method for broadcasting waves and recording media, and there is a high possibility that the decoding unit is provided to the reproducing apparatus. Accordingly, a display apparatus is not always provided with a reproducing apparatus.

It is desirable to use a motion vector in a display apparatus to perform a frame rate conversion, the motion vector being obtained by decoding processing performed in a reproducing apparatus, in the case where the reproducing apparatus that decodes a video signal encoded using the motion vector is provided separately from the display apparatus that displays the decoded video signal at a higher frame rate.

According to an embodiment of the present invention, there is provided a frame rate conversion system including a transmitter and a receiver. The transmitter includes a decoding unit configured to decode a compressed video signal encoded by an encoding method using a motion vector, and an encoding unit configured to superimpose reference control information being output from the decoding unit and containing at least a motion vector on a blanking period of the video signal decoded by the decoding unit; and outputs the video signal with the reference control information superimposed by the encoding unit. The receiver includes a decoding unit configured to separate the reference control information from the blanking period of the video signal input from the transmitter, and a frame rate converting unit configured to generate an interpolated frame between frames of the input video signal using the reference control information separated by the decoding unit and to convert the input video signal into the signal of a higher frame rate.

Processing of superimposing the reference control information being output from the decoding unit and containing at least the motion vector on the blanking period of the decoded video signal is performed in the transmitter including the decoding unit in the frame rate conversion system. Subsequently, the video signal with the reference control information superimposed thereon is output from the transmitter.

Processing of separating the reference control information from the blanking period of the video signal input from the transmitter is performed in the receiver. Subsequently, the interpolated frame is generated between frames of the input video signal using the separated reference control information, thereby converting the input video signal into the signal of a higher frame rate.

Therefore, when applying the embodiment of the present invention to the case where the reproducing apparatus including the decoding unit is provided separately from the display apparatus including the frame rate converting unit (the transmitter and receiver of this embodiment are respectively applied to the reproducing apparatus and the display apparatus), the frame rate conversion can be performed by generating a more natural interpolated frame using the motion vector. In this frame rate conversion, the display apparatus may not require a detecting unit having high processing capability of detecting the motion vector within a limited time until displaying the following frame after the frame rate conversion, and may not require related power consumption for such detection processing.

In addition, since the interpolated frame is not generated in the reproducing apparatus, the reproducing apparatus and the display apparatus need not be connected with a cable having a large transmission volume corresponding to the high frame rate video.

Further, since the compressed video signal is not decoded in the display apparatus, a video signal output from a reproducing apparatus supporting various encoding methods using the motion vector can be input into the display apparatus to be converted into the signal of a higher frame rate.

According to an embodiment of the present invention, there is provided a method of converting a frame rate of a video signal output from a transmitter that includes a decoding unit configured to decode a compressed video signal encoded by an encoding method using a motion vector, and input into a receiver that converts the input video signal into the signal of a higher frame rate. The method of converting a frame rate according to an embodiment of the present invention includes the steps of:

superimposing in the transmitter reference control information being output from the decoding unit and containing at least a motion vector on a blanking period of the video signal decoded by the decoding unit;

separating in the receiver the reference control information from the blanking period of the video signal input from the transmitter; and generating in the receiver an interpolated frame between frames of the input video signal using the reference control information separated at the separating step and converting the input video signal into the signal of a higher frame rate.

The method of converting a frame rate corresponds to processing steps performed in the above-described frame rate conversion system according to an embodiment of the present invention. In the case where the reproducing apparatus including the decoding unit is provided separately from the display apparatus including the frame rate converting unit, the frame rate conversion can be performed by generating a more natural interpolated frame using the motion vector. In this frame rate conversion, the display apparatus may not require a detecting unit or the like having high processing capability. Further, the reproducing apparatus and the display apparatus need not be connected with a cable having a large transmission volume corresponding to the high frame rate video, and a video signal output from a reproducing apparatus supporting various encoding methods using the motion vector can be input into the display apparatus to be converted into the signal of a higher frame rate.

According to an embodiment of the present invention, there is provided a transmitter including: a decoding unit configured to decode a compressed video signal encoded by an encoding method using a motion vector, and an encoding unit configured to superimpose reference control information being output from the decoding unit and containing at least a motion vector on a blanking period of the video signal decoded by the decoding unit; and outputting the video signal with the reference control information superimposed by the encoding unit.

The transmitter is included in the above-described frame rate conversion system according to the embodiment of the present invention and is set to collaborate with the above-described receiver. Accordingly, in the case where a reproducing apparatus including the decoding unit is provided separately from a display apparatus including the frame rate converting unit, the frame rate conversion can be performed by generating a more natural interpolated frame using the motion vector. In this frame rate conversion, the display apparatus may not require a detecting unit or the like having high processing capability. Further, the reproducing apparatus and the display apparatus need not be connected with a cable having a large transmission volume corresponding to the high frame rate video, and a video signal output from a reproducing apparatus supporting various encoding methods using the motion vector can be input into the display apparatus to be converted into the signal of a higher frame rate.

According to an embodiment of the present invention, there is provided a receiver including: a decoding unit configured to separate reference control information containing at least a motion vector from a blanking period of an input video signal, and a frame rate converting unit configured to generate an interpolated frame between frames of the input video signal using the reference control information separated by the decoding unit and to convert the input video signal into the signal of a higher frame rate.

The receiver is included in the above-described frame rate conversion system according to the embodiment of the present invention and is set to collaborate with the above-described transmitter. Accordingly, in the case where a reproducing apparatus including the decoding unit is provided separately from a display apparatus including the frame rate converting unit, the frame rate conversion can be performed by generating a more natural interpolated frame using the motion vector. In this frame rate conversion, the display apparatus may not require a detecting unit or the like having high processing capability. Further, the reproducing apparatus and the display apparatus need not be connected with a cable having a large transmission volume corresponding to the high frame rate video, and a video signal output from a reproducing apparatus supporting various encoding methods using the motion vector can be input into the display apparatus to be converted into the signal of a higher frame rate.

According to the embodiments of the present invention, in the case where the reproducing apparatus that decodes the video signal encoded using the motion vector is provided separately from the display apparatus that displays the decoded video signal at a higher frame rate, the frame rate conversion can be performed by generating a more natural interpolated frame using the motion vector without requiring a detecting unit having high processing capability or the like in the display apparatus. Further, there is no need to connect the reproducing apparatus and the display apparatus with the cable having a large transmission volume corresponding to the high frame rate video. Furthermore, the video signal output from the reproducing apparatus supporting various encoding methods using the motion vector can be input into the display apparatus to be converted into the signal of a higher frame rate.

DESCRIPTION OF THE PREFERRED EMBODIMENTS

Figure 1:
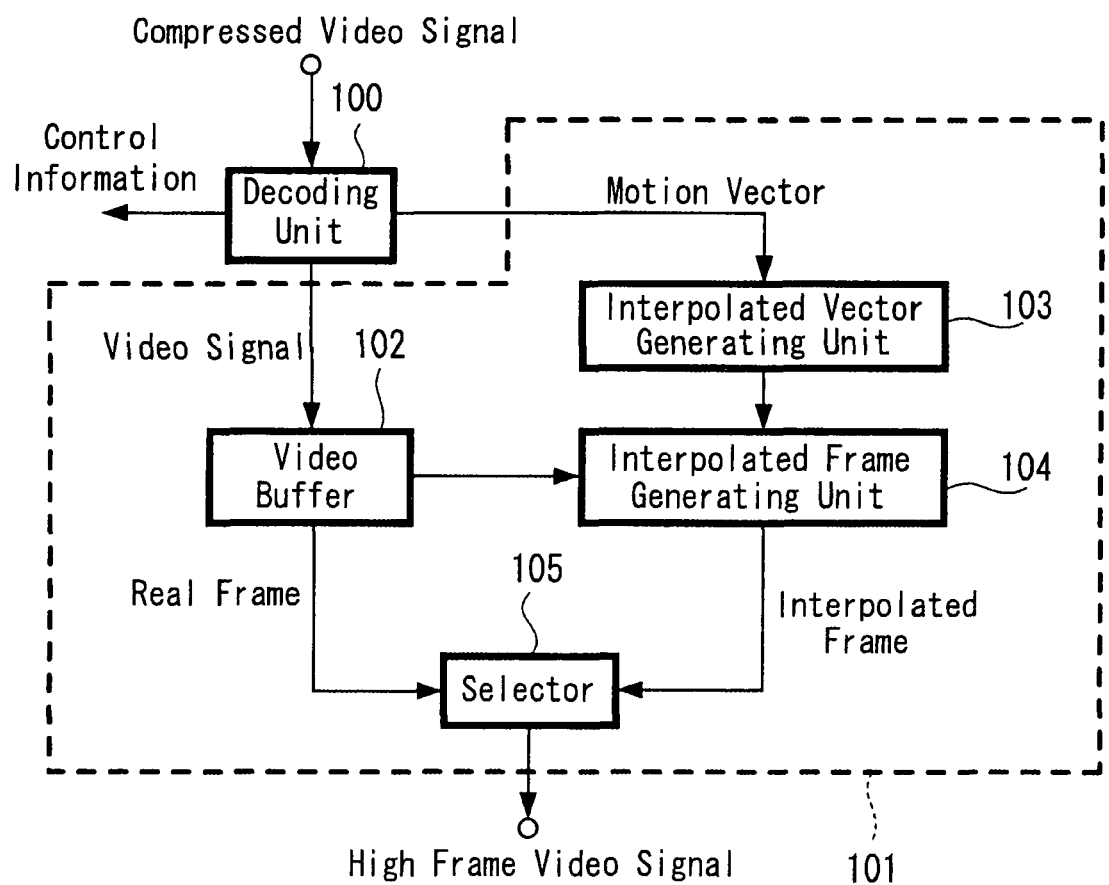
FIG. 1 is a block diagram showing an example of a configuration of a frame rate converter according to related art.
Figure 2:
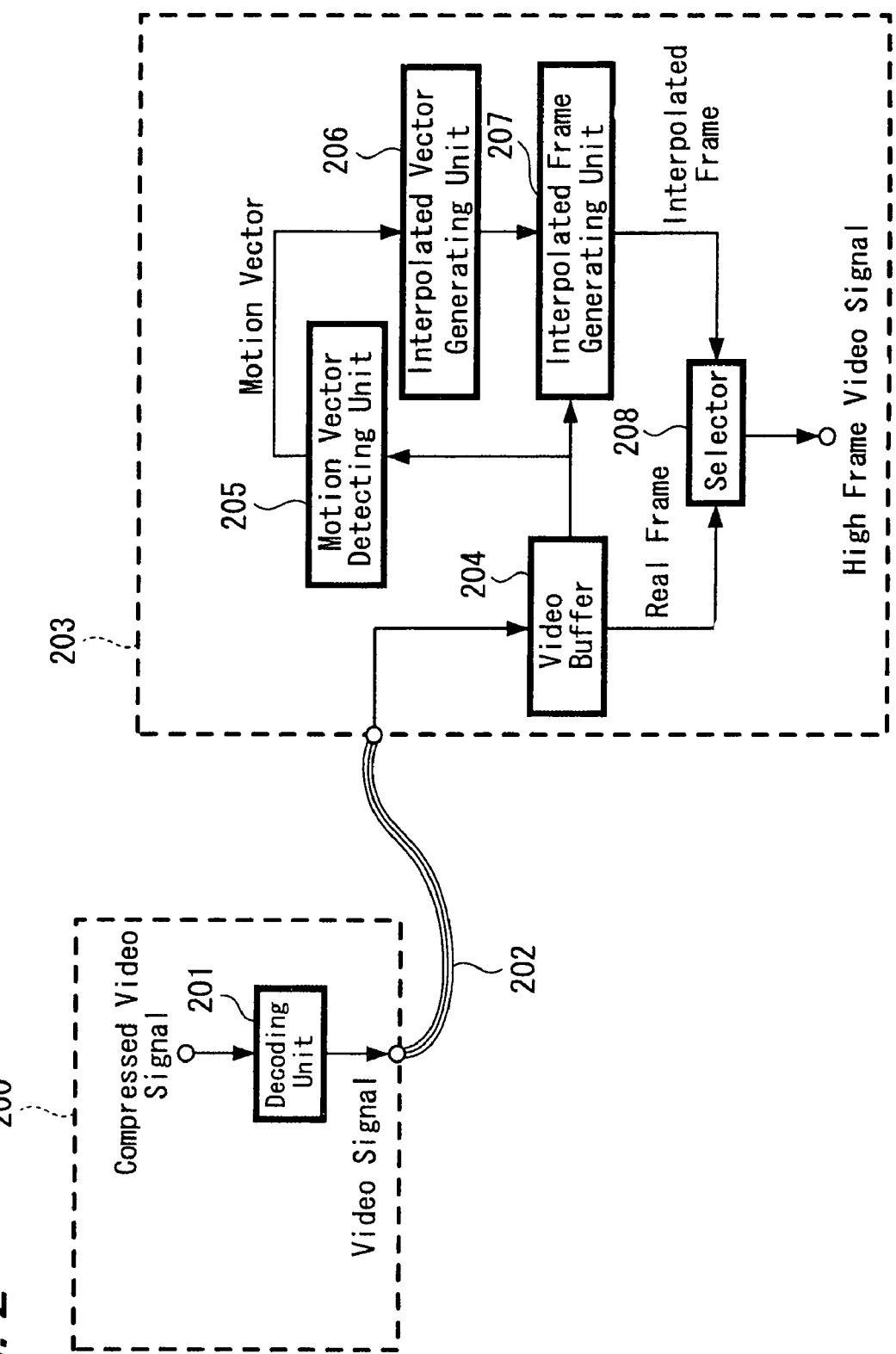
FIG. 2 is a block diagram showing a configuration of a frame rate converting unit in a display apparatus that is provided separately from a reproducing apparatus.

Prior to describing embodiments according to the present invention, another example of a configuration and problems thereof are herein described. In the case where a reproducing apparatus such as a DVD player is provided separately from a display apparatus such as a television receiver, the reproducing apparatus and the display apparatus are connected using an analogue video signal cable such as a composite cable or a digital video signal cable such as HDMI, and only an encoded video signal is transmitted. Therefore, it is still necessary to detect a motion vector in a display apparatus that is provided separately from the reproducing apparatus. FIG. 2 is a block diagram showing a configuration of a frame rate converting unit in such display apparatus. The video signal alone is sent from a decoding unit 201 included in a reproducing apparatus 200 to a display apparatus 203 through a video cable 202.

The video signal is stored in a video buffer 204 in the display apparatus 203. Subsequently, a motion vector detecting unit 205 detects a motion vector between video blocks in frames previous and subsequent to an interpolated frame from the video signal stored in the video buffer 204 within a frame unit of time after a frame rate conversion. Further, an interpolated vector generating unit 206 generates an interpolated vector using the detected motion vector. Then, an interpolated frame generating unit 207 reads pictures previous and subsequent to the interpolated frame from the video buffer 204, and generates a predicted frame of the interpolated frame at a position in terms of time using the interpolated vector. Consequently, a selector 208 selects and outputs the picture (real frame) stored in the video buffer 204 and the generated interpolated frame according to the frame rate.

As described above, in the case where the frame rate conversion is performed using the motion vector in the display apparatus provided separately from the reproducing apparatus, it is necessary to detect the motion vector within a limited time until displaying the following frame after the frame rate conversion. Therefore, not only a detecting unit having a high processing capability but also power consumption for such detection processing may be required, which is not user-friendly in light of costs.

On the contrary, in the case where the frame rate conversion is performed in the reproducing apparatus, it is necessary to use a plurality of video signal cables or the like, since the video signals may increase more than the original video after being converted into a higher frame rate. However, the plurality of cables may increase costs, and the increased number of terminals may be inconvenient for the user.

Thus, in the case where the reproducing apparatus including the decoding unit is provided separately from the display apparatus including the frame rate converting unit, a possibility for the user to enjoy the high frame rate video is limited.

Figure 3:
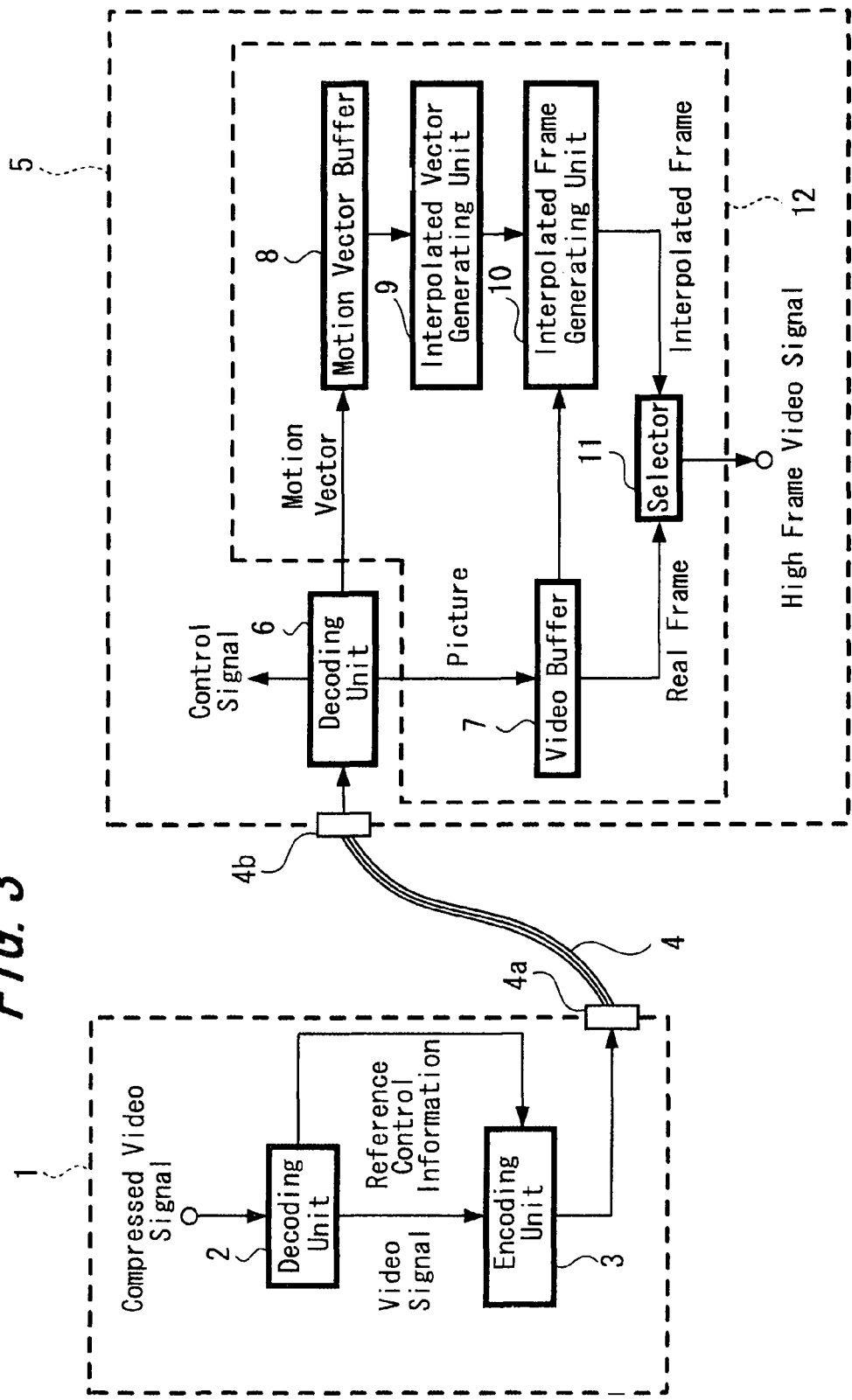
FIG. 3 is a block diagram showing an example of a configuration of a frame rate conversion system according to an embodiment of the present invention.

Embodiments of the present invention are hereinafter described with reference to accompanied drawings. FIG. 3 is a block diagram showing an example of a configuration of a frame rate conversion system to which an embodiment according to the present invention is applied. The frame rate conversion system includes: a reproducing apparatus 1 (such as STB (Set-Top Box), optical disk player, digital tuner and camcorder, for example) as an example of a transmitter, and a display apparatus 5 (such as television receiver and display, for example) as an example of a receiver, which are provided separately from each other.

The reproducing apparatus 1 includes a decoding unit 2 and an encoding unit 3 provided as circuits relating to the embodiment of the present invention, and a compressed video signal encoded using MPEG encoding algorithm is supplied to the decoding unit 2. Since the decoding unit 2 is a decoder of MPEG standard the configuration of which has been known, a detailed explanation thereof is herein omitted. The video signal decoded by the decoding unit 2 is supplied to the encoding unit 3.

Further, as known in general, a quantization conversion coefficient, motion vector, identifier indicating a mode of predictive compensation of respective decoded pictures (such as any of intra-image prediction (picture I), forward prediction (picture P) and bidirectional prediction (picture B)), and identifier indicating the order of displaying decoded pictures are decoded by a variable-length decoding circuit (not illustrated) and supplied to an inverse quantization circuit and motion compensation circuit (not illustrated) in the decoding unit 2. Among those, the motion vector, identifier indicating the mode of predictive compensation, and the identifier indicating the order of displaying decoded video signals are supplied as reference control information from the decoding unit 2 to the encoding unit 3.

The encoding unit 3 is a circuit configured to perform processing of superimposing the reference control information on a blanking period of the supplied video signal. The video signal with the reference control information superimposed by the encoding unit 3 is output from the reproducing apparatus 1 and transmitted to the display apparatus 5 through a video cable 4 connected between detachable connectors 4a and 4b. Other than using the video cable 4, the video signal with the reference control information superimposed thereon may be transmitted wirelessly from the reproducing apparatus 1 to the display apparatus 5.

The display apparatus 5 includes a decoding unit 6, and a frame rate converting unit 12 that includes: a video buffer 7, a motion vector buffer 8, an interpolated vector generating unit 9, an interpolated frame generating unit 10 and a selector 11 as circuits relating to the embodiment of the present invention.

The video signal input into the display apparatus 5 through the video cable 4 is supplied to the decoding unit 6. The decoding unit 6 is a circuit configured to perform processing of separating the above-described reference control information from the blanking period of the supplied video signal.

It should be noted that a transmission mode of the video signal transmitted from the reproducing apparatus 1 to the display apparatus 5 may be an analogue signal such as a composite signal, or a digital signal. In the case of the analogue video signal, the encoding unit 3 may superimpose the reference control information on a line not used for text broadcasting in a vertical blanking interval, the video cable 4 may be a composite video cable or the like generally used, and the decoding unit 6 separates the reference control information from the above-described line.

HDMI (High Definition Multimedia Interface) that is a standard for high quality transmission of uncompressed digital video signals has started to be used as a transmission standard for digital video signals. In the case where the reproducing apparatus 1 and the display apparatus 5 are devices that input and output a video signal conforming to the HDMI standard, the reference control information may be superimposed as described below.

Figure 4:
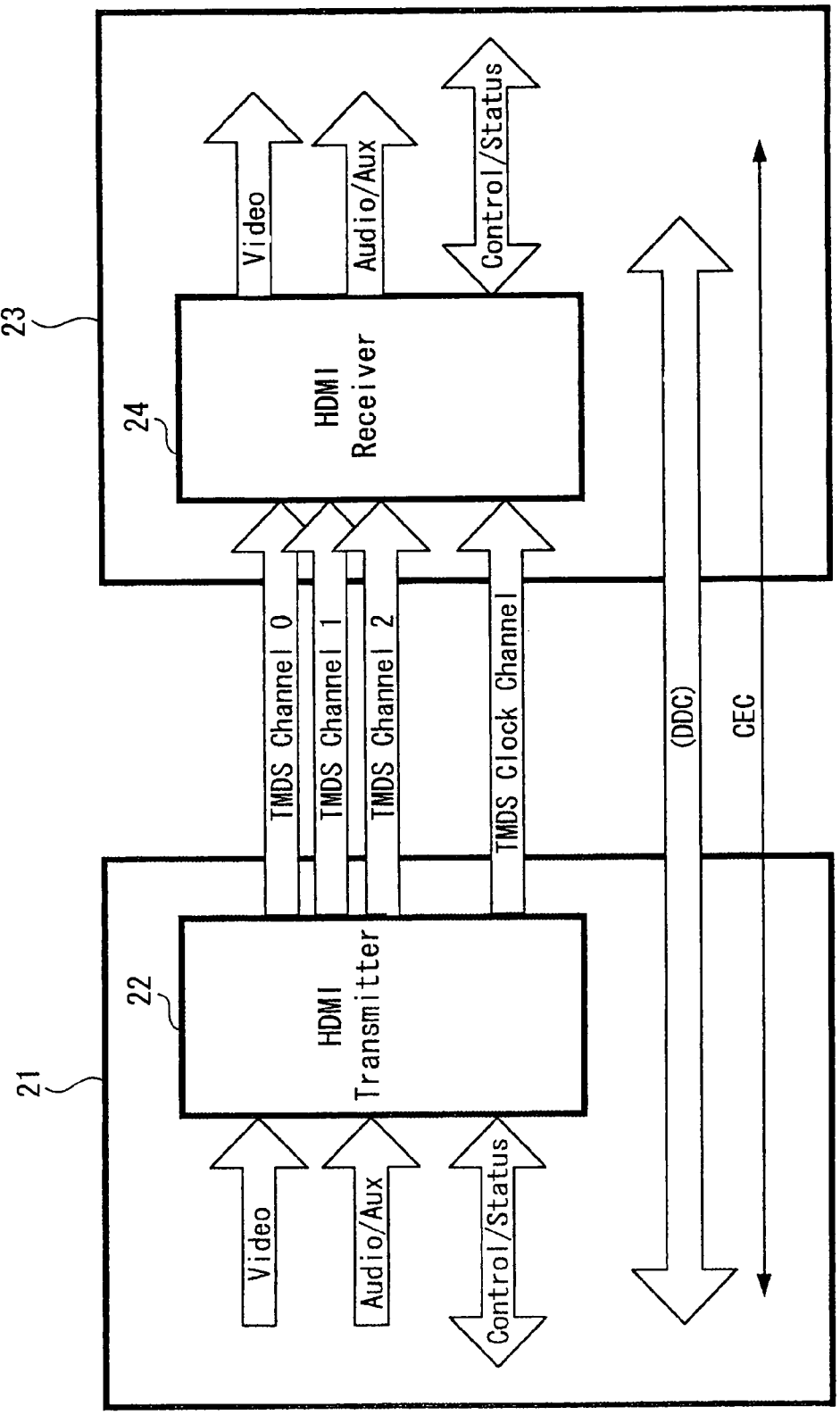
FIG. 4 is a schematic diagram showing a device that conforms to HDMI standard.

FIG. 4 is a schematic diagram showing devices conforming to the HDMI standard. An HDMI transmitter 22 is provided in an HDMI source 21 transmitting a video signal. The HDMI transmitter 22 encodes respective supplied signals of video (video signal), audio/AUX (Auxiliary) and control/status into serial data on three TDMS (Transition Minimized Differential Signaling) channels 0 through 2 to be output, and also outputs a pixel clock of the video from a TMDS clock channel. The data on those channels, data on a DDC (Display Data Channel) for supplying specific information (resolution and the like) regarding a display, and a control signal for bidirectional control based on CEC (Consumer Electronics Control) protocol, which is option, are transmitted to an HDMI sink 23 receiving the video signal from the HDMI source 21 using one cable (HDMI cable).

An HDMI receiver 24 is provided in the HDMI sink 23. The HDMI receiver 24 restores respective signals of the original video, audio/AUX and control/status from the serial data on the TMDS channels 0 through 2 by referring to the pixel clock transmitted on the TDMS clock channel.

Figure 5:
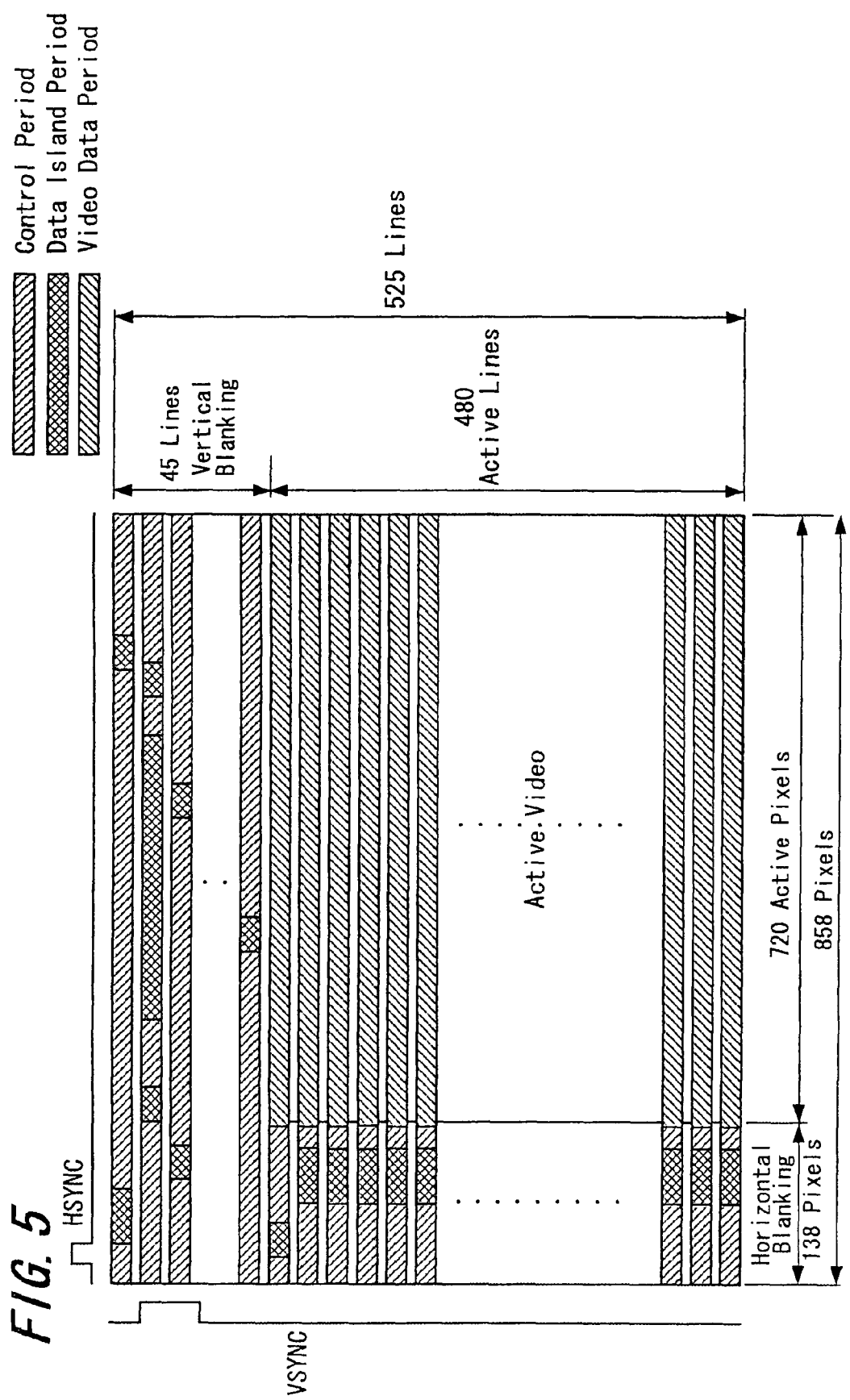
FIG. 5 is a diagram showing an example of a data island period contained in a video frame in HDMI.

FIG. 5 is a diagram showing an example (in the case where an active video is composed of 720×480 pixels) of a data island period that is a period of transmitting the audio/AUX in a video frame in the HDMI. The data island periods are dispersedly located at specific pixel positions in a horizontal blanking period of 138 pixels of each active line and in vertical blanking period of 45 lines, respectively.

In the case where the reproducing apparatus 1 and display apparatus 5 shown in FIG. 3 input and output video signals conforming to the HDMI standard (in other words, those apparatuses are the HDMI source and HDMI sink respectively), the encoding unit 3 and the decoding unit 6 may be respectively configured as part of the HDMI transmitter 22 and HDMI receiver 24 shown in FIG. 4 conforming to the HDMI standard. The encoding unit 3 may superimpose the reference control information as a kind of AUX data on the data island period shown in FIG. 5, and the decoding unit 6 may separate the reference control information from the data island period. Accordingly, the embodiment of the present invention can also be applied to the case where the reproducing apparatus 1 and display apparatus 5 are the devices that input and output the video signals conforming to the HDMI standard.

Description returns to FIG. 3. The video signal from which the reference control information is separated by the decoding unit 6 is recorded in the video buffer 7 as a picture of the real frame along with the identifier indicating the mode of predictive compensation and identifier indicating the order of displaying respective pictures contained in the reference control information in the display apparatus 5. In addition, the motion vector contained in the separated reference control information is recorded in the motion vector buffer 8. Further, a control signal to control respective units in the display apparatus 5 using the separated reference control information is output from the decoding unit 6.

The interpolated vector generating unit 9 generates an interpolated vector from the motion vector used for the prediction of the pictures of the real frames previous and subsequent to the interpolated frame among the motion vectors stored in the motion vector buffer 8. Specifically, a length of the motion vector separated by the decoding unit 6 is the length corresponding to a time interval between the real frames. The interpolated frame is generated in the display at a high frame rate such that the interpolated frame is inserted between the real frames, and therefore, the interpolated vector is generated by converting the length of the motion vector into a length proportional to a time interval between the real frame and the interpolated frame.

The interpolated frame generating unit 10 reads the pictures of real frames previous and subsequent to the interpolated frame from the video buffer 7 based on the above-described identifiers. Subsequently, the interpolated frame generating unit 10 generates the interpolated frame to be inserted between those pictures of real frames based on the prediction using the interpolated vector generated by the interpolated vector generating unit 9.

The selector 11 selects and outputs one of the picture (real frame) stored in the video buffer 7 and the interpolated frame generated by the interpolated frame generating unit 10 at display timing matched to the frame rate after the conversion. The video signal thus output from the selector 11 at a higher frame rate is supplied to a display drive circuit (not illustrated) in the display apparatus 5 and displayed on the screen of the display apparatus 5.

Among the pictures stored in the video buffer 7, the picture that is selected by the selector 11 and is not used for generating the interpolated frame is, for example, deleted by overwriting with a picture newly supplied from the decoding unit 6. In addition, among the motion vectors stored in the motion vector buffer 8, the motion vector not used for generating the interpolated vector is also deleted, for example, by overwriting with a motion vector newly supplied from the decoding unit 6.

Figure 6:
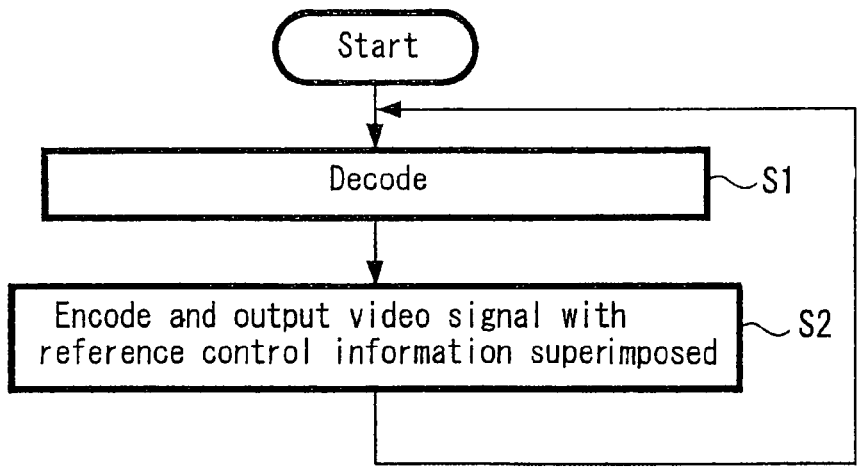
FIG. 6 is a flow chart showing processing performed in a reproducing apparatus illustrated in FIG. 3.
Figure 7:
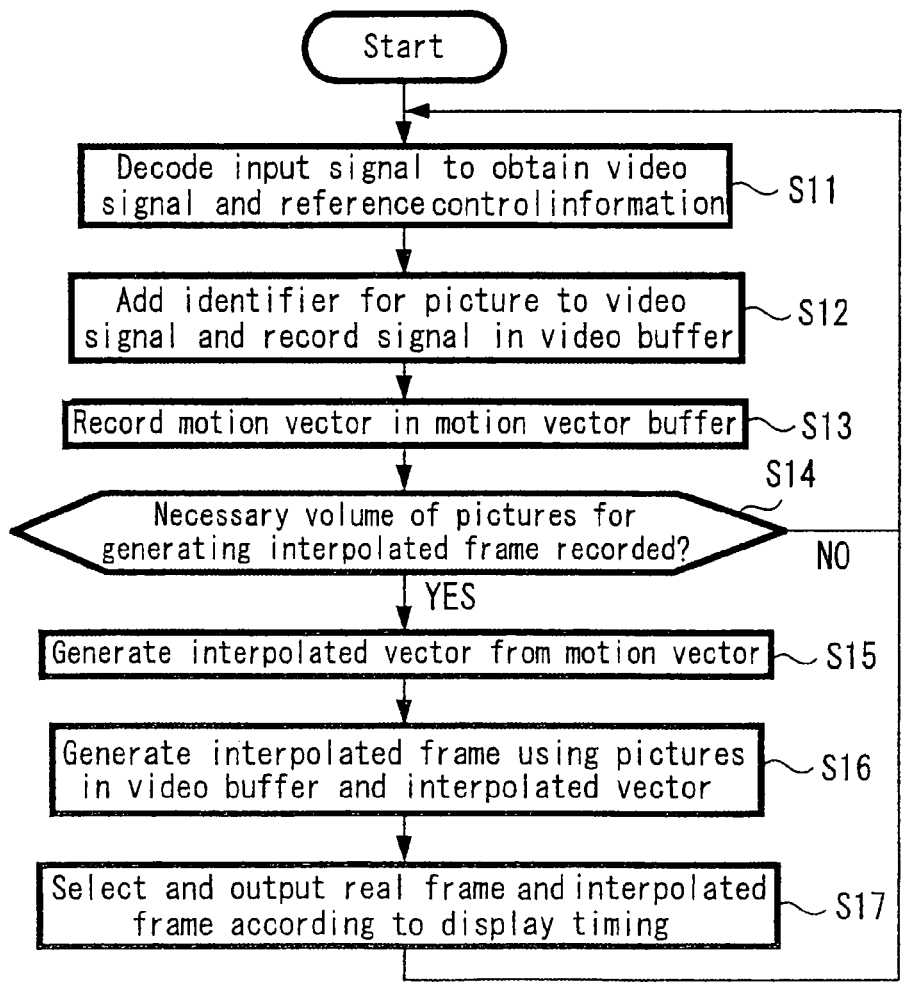
FIG. 7 is a flow chart showing processing performed in a display apparatus illustrated in FIG. 3.

FIGS. 6 and 7 are diagrams showing processing steps performed in the reproducing apparatus 1 and display apparatus 5 as flow charts. As shown in FIG. 6, the decoding unit 2 decodes a specific volume of compressed video signals, and the decoded video signals and obtained reference control information containing the motion vector, above-described identifier indicating the mode of predictive compensation and identifier indicating the display order are supplied to the encoding unit 3 in the reproducing apparatus 1 (step S1). The encoding unit 3 encodes the supplied video signals such that the reference control information is superimposed on the blanking period, and outputs the encoded video signals from the reproducing apparatus 1 at a suitable timing using an internal output buffer or the like (step S2). Subsequently, the processing step returns to step S1, and the processing steps are repeated regarding the next specific volume of compressed video signals.

As shown in FIG. 7, the decoding unit 6 decodes the video signals input into the display apparatus 5, and obtains the video signals from which reference control information is separated, and the reference control information in the display apparatus 5 (step S11). Subsequently, the identifier indicating the mode of predictive compensation and identifier indicating the display order for respective pictures contained in the reference control information are added to the video signals, and the video signals are recorded in the video buffer 7 (in the case where there is an unnecessary picture recorded in the video buffer 7, the picture is overwritten and deleted) (step S12). Further, the motion vector contained in the reference control information is recorded in the motion vector buffer 8 (in the case where there is an unnecessary motion vector recorded in the motion vector buffer 8, the motion vector is overwritten and deleted) (step S13).

Subsequently, it is confirmed whether a necessary volume of pictures for generating an interpolated frame is recorded in the video buffer 7 (step S14). If it is judged NO, the processing step returns to step S11, and steps S11 through S14 are repeated.

The step S14 is described in detail. Since the pictures of the real frames previous and subsequent to the interpolated frame are used in the case of generating the interpolated frame, the picture of the real frame displayed after the interpolated frame is also needed. In the case where an interpolated frame denoted by C1 is generated between pictures I and B1 of real frames by using a motion vector, for example, the pictures I and B1 as well as an interpolated vector half the motion vector 31 between the pictures I and B1, for example, are needed as shown in FIG. 8.

Further, there exists a delay time T1 until the picture I is read from the video buffer 7 after input into the display apparatus 5, and further a time T2 is needed to generate the interpolated frame C1. Therefore, the interpolated frame C1 can be displayed at an interval between the time when the picture B1 of the real frame is input and the time when a picture B2 of the real frame is input.

Similarly, in the case where an interpolated frame denoted by C2 is generated between the pictures B1 and B2 of the real frames, and in the case where an interpolated frame denoted by C3 is generated between the pictures B2 and P of the real frames, the same processing as described above is needed.

Figure 8:
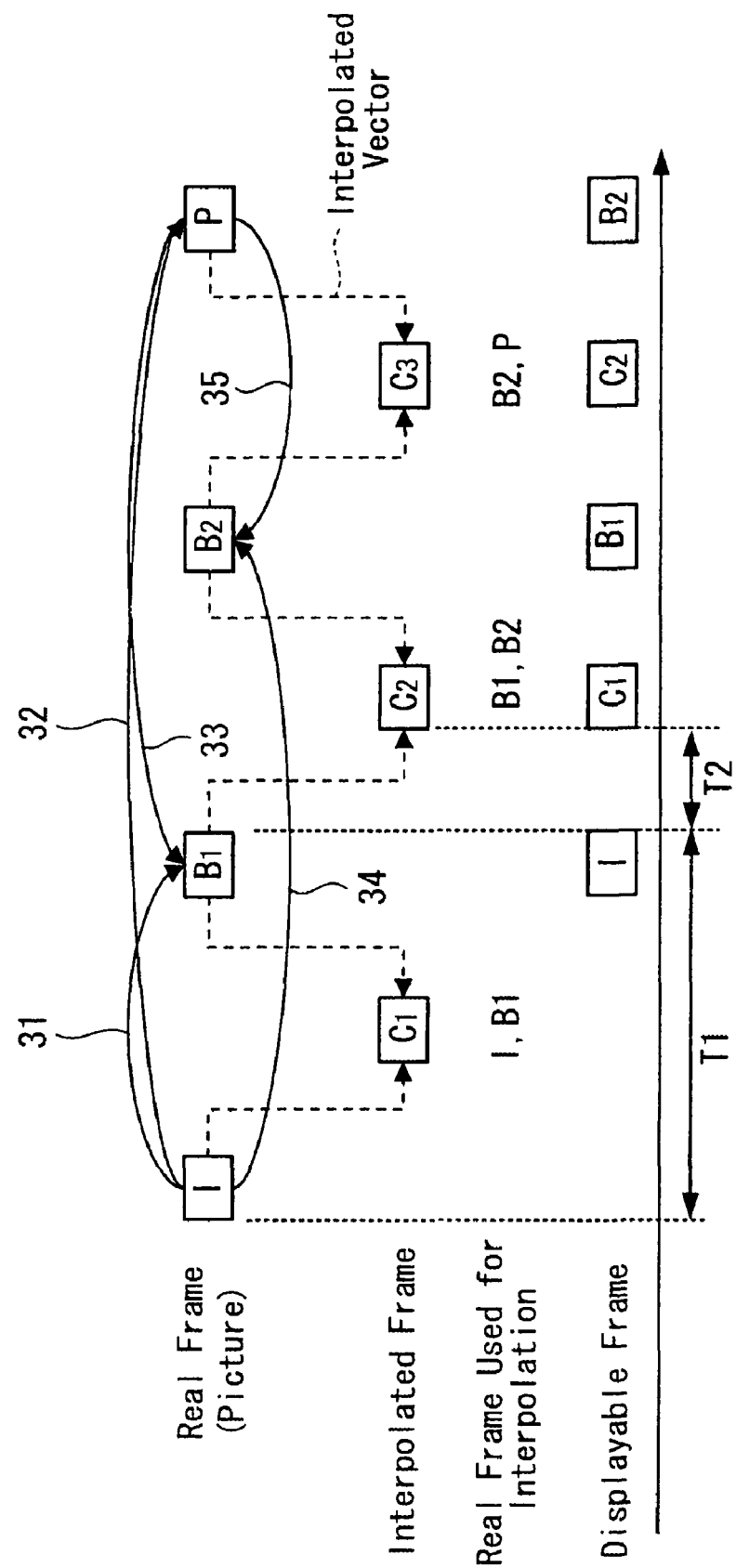
FIG. 8 is a diagram illustrating an example of pictures used for generating an interpolated frame.

FIG. 8 shows an example in which the interpolated frame is generated by using the real frames immediately previous and subsequent to the interpolated frame. However, in the case where real frames further separated in terms of time are used (for example, in the case where the picture B2 and an interpolated vector one-fourth the motion vector 34 between the pictures I and B2 are also used, or the picture P and an interpolated vector one-sixth the motion vector 32 between the pictures I and P are also used to generate the interpolated frame C1 shown in FIG. 8), the time at which the interpolated frame can be displayed is further delayed.

Hence, it is checked at step S14 shown in FIG. 7 whether the necessary volume of pictures for generating the interpolated frame is recorded, and the processing steps S11 through S14 are repeated in the case where the volume is insufficient.

Upon the judgment indicating YES at step S14, the interpolated vector generating unit 9 generates an interpolated vector from the motion vector used for the prediction of the pictures of the real frames previous and subsequent to the interpolated frame among the motion vectors recorded in the motion vector buffer 8 (step S15).

Subsequently, the interpolated frame generating unit 10 reads the pictures of the real frames previous and subsequent to the interpolated frame from the video buffer 7 based on the identifiers, and generates the interpolated frame to be inserted between the pictures of the real frames based on the prediction using the interpolated vector generated by the interpolated vector generating unit 9 (step S16).

Then, the selector 11 selects and outputs one of the frame of the picture stored in the video buffer 7 and the interpolated frame generated by the interpolated frame generating unit 10 at a display timing matched to the frame rate after the conversion (step S17). Subsequently, the processing step returns to step S11.

As heretofore described, according to the system shown in FIG. 3, the frame rate conversion can be performed by generating a more natural interpolated frame using the motion vector. According to this system, although the reproducing apparatus 1 including the decoding unit 2 is provided separately from the display apparatus 5 including the frame rate converting unit 12, a detecting unit having high processing capability of detecting the motion vector within a limited time until displaying the following frame after the frame rate conversion, and power consumption relating to such detection processing are not required in the display apparatus 5.

Further, since the interpolated frame is not generated in the reproducing apparatus 1, there is no need to use a cable having a large transmission volume corresponding to high frame rate video for the video cable 4 that connects the reproducing apparatus 1 and the display apparatus 5.

Further, since the compressed video signal is not decoded in the display apparatus 5, a video signal output from reproducing apparatuses supporting various encoding methods using the motion vector can be input into a display apparatus to be converted into the signal of a higher frame rate. For example, a reproducing apparatus may include a decoding unit supporting an encoding method using the motion vector other than the MEPG, instead of the decoding unit 2, and a video signal and reference control information are supplied to the encoding unit 3 from the decoding unit.

In addition, since the identifier indicating the mode of predictive compensation and identifier indicating the display order for respective pictures are contained in the reference control information superimposed on the video signal in the reproducing apparatus 1, the interpolated frame generating unit 10 reads the pictures of the real frames previous and subsequent to the interpolated frame from the video buffer 7 based on those identifiers without error, thereby generating the interpolated frame in the display apparatus 5 as described above.

Modified examples (1) through (6) regarding the above-described embodiments are described in the followings.

(1) The encoding unit 3 in the reproducing apparatus 1 may compress the reference control information and superimpose the compressed information on the blanking period of the video signal, and the decoding unit 6 in the display apparatus 5 may decompress the reference control information separated from the blanking period of the video signal. Accordingly, a limited bandwidth of the blanking period of the transmitted signal can be used efficiently.

(2) Only an efficient motion vector such as a motion vector of a small macro-block difference, for example, may be superimposed on the blanking period of the video signal instead of superimposing all the motion vectors on the blanking period of the video signal. Accordingly, the limited bandwidth of the blanking period of the transmitted signal can be used efficiently, in the case of MPEG-4 performing highly efficient compression using motion vectors from a plurality of images.

(3) Not only the video signal or the like is transmitted from the reproducing apparatus 1 to the display apparatus 5, but also a control signal may be inversely transmitted to the reproducing apparatus 1 from a control unit (CPU or the like)

included in the display apparatus 5, giving instructions to start reproduction, checking the transmission output of the reference control information, giving instructions to the transmission input, and indicating a transmission volume thereof. For example, in the case of the device conforming to the HDMI standard, the control signal for bidirectional control based on the CEC protocol can be transmitted as described above (FIG. 4), and therefore the control signal may be sent to the reproducing apparatus 1 using the CEC protocol. Accordingly, the reference control information can be transmitted mutually only between the devices to which the embodiment of the present invention is applied, and the transmission volume can be controlled dynamically.

(4) In the case where another video is displayed on the display apparatus 5 while the video signal is being input from the reproducing apparatus 1 to the display apparatus 5, the decoding unit 6 may separate the reference control information from the video signal being input, and the video signal to which the identifier indicating the mode of predictive compensation and identifier indicating the display order are added may be recorded in the video buffer 7 and the motion vector may be recorded on the motion vector buffer 8. Accordingly, since there is no need to wait for elapse of the delay time shown as T1 in FIG. 8 when the input video signal is displayed afterward at a higher frame rate, the video can be displayed without delays.

(5) In the case where the decoding order of compressed video signals is the same as the display order of decoded pictures and in the case where the display order of decoded pictures is unambiguously known in the display apparatus 5, the identifier indicating the display order may not be contained in the reference control information. In addition, the identifier indicating the mode of predictive compensation may not be contained in the reference control information in the case where the mode of predictive compensation for respective pictures (such as any of picture I, picture P and picture B) can be identified directly from the motion vector.

(6) Although the receiver according to an embodiment of the present invention is applied to the display apparatus 5 in the examples heretofore described, the receiver according to an embodiment of the present invention may also be applied to a frame rate conversion apparatus not including a display unit.

It should be understood by those skilled in the art that various modifications, combinations, sub-combinations and alterations may occur depending on design requirements and other factors insofar as they are within the scope of the appended claims or the equivalents thereof.

What is claimed is:

1. A frame rate conversion system comprising:
 a transmitter and a receiver,
  the transmitter including
   a decoding unit configured to decode a compressed video signal encoded by an encoding method using a motion vector, and
   an encoding unit configured to superimpose reference control information being output from the decoding unit and containing at least a motion vector on a blanking period of the video signal decoded by the decoding unit, and
   outputting the video signal with the reference control information superimposed by the encoding unit; and
  the receiver including
   a decoding unit configured to separate the reference control information from the blanking period of the video signal input from the transmitter, and
   a frame rate converting unit configured to generate an interpolated frame between frames of the input video signal using the reference control information separated by the decoding unit and to convert the input video signal into the signal of a higher frame rate;
 wherein the transmitter is an apparatus that outputs a digital video signal conforming to the HDMI (High Definition Multimedia Interface) standard,
 the encoding unit is provided within the transmitter conforming to the HDMI standard and superimposes the reference control information on a data island period contained in a video frame,
 the receiver is an apparatus that inputs the digital video signal conforming to the HDMI standard, and
 the decoding unit in the receiver is provided within the receiver conforming to the HDMI standard and separates the reference control information from the data island period contained in the video frame.

2. The frame rate conversion system according to claim 1, wherein:
 the video signal with the reference control information superimposed is transmitted to the receiver through a detachable cable or wireless transmission from the transmitter.

3. The frame rate conversion system according to claim 1, wherein:
 the reference control information includes
  a motion vector,
  an identifier indicating a mode of predictive compensation, and
  an identifier indicating the display order of the decoded video signals, which are output from the decoding unit in the transmitter.

4. The frame rate conversion system according to claim 1, wherein:
 the receiver further includes a control unit configured to send a control signal to the transmitter, the control signal indicating whether to transmit the video signal with the reference control information superimposed and/or a transmission volume of the video signal.

5. A method of converting a frame rate of a video signal output from a transmitter that includes a decoding unit configured to decode a compressed video signal encoded by an encoding method using a motion vector, and input into a receiver that converts the input video signal into the signal of a higher frame rate, the method comprising the steps of:
 superimposing in the transmitter reference control information being output from the decoding unit and containing at least a motion vector on a blanking period of the video signal decoded by the decoding unit;
 separating in the receiver the reference control information from the blanking period of the video signal input from the transmitter; and
 generating in the receiver an interpolated frame between frames of the input video signal using the reference control information separated at the separating step, and converting the input video signal into the signal of a higher frame rate;
 wherein the transmitter is an apparatus that outputs a digital video signal conforming to the HDMI (High Definition Multimedia Interface) standard,
 the encoding unit is provided within the transmitter conforming to the HDMI standard and superimposes the reference control information on a data island period contained in a video frame, the receiver is an apparatus that inputs the digital video signal conforming to the HDMI standard, and the decoding unit in the receiver is provided within the receiver conforming to the HDMI standard and separates the reference control information from the data island period contained in the video frame.

6. A transmitter comprising:

a decoding unit configured to decode a compressed video signal encoded by an encoding method using a motion vector; and an encoding unit configured to superimpose reference control information being output from the decoding unit and containing at least a motion vector on a blanking period of the video signal decoded by the decoding unit, and to output the video signal with the reference control information superimposed by the encoding unit;

wherein the transmitter is an apparatus that outputs a digital video signal conforming to the HDMI (High Definition Multimedia Interface) standard, and the encoding unit is provided within the transmitter conforming to the HDMI standard and superimposes the reference control information on a data island period contained in a video frame.

7. The transmitter according to claim 6, wherein:

the reference control information includes
- a motion vector,
- an identifier indicating a mode of predictive compensation, and
- an identifier indicating the display order of the decoded video signals, which are output from the decoding unit.

8. A receiver comprising:

a decoding unit configured to separate reference control information containing at least a motion vector from a blanking period of an input video signal; and a frame rate converting unit configured to generate an interpolated frame between frames of the input video signal using the reference control information separated by the decoding unit and to convert the input video signal into the signal of a higher frame rate;

wherein the receiver is an apparatus that inputs a digital video signal conforming to the HDMI (High Definition Multimedia Interface) standard, and the decoding unit is provided within the receiver conforming to the HDMI standard and separates the reference control information from a data island period contained in a video frame.

9. The receiver according to claim 8, wherein:

the video signal is input through a detachable cable or wireless transmission from a transmitter that outputs a video signal with the reference control information superimposed on a blanking period of the video signal.

10. The receiver according to claim 8, wherein:

the reference control information includes
- a motion vector,
- an identifier indicating a mode of predictive compensation, and
- an identifier indicating the display order of decoded video signals, which are output from the decoding unit.

11. The receiver according to claim 8, further comprising:

a control unit configured to output a control signal indicating whether to transmit the video signal with the reference control information superimposed and/or a transmission volume of the video signal.

\* \* \* \* \*